Sept. 8, 1970  D. W. YOUNG, JR  3,528,070
MULTIFUNCTION CROSSED BEAM RADAR SYSTEM
Filed Dec. 30, 1968  3 Sheets-Sheet 1
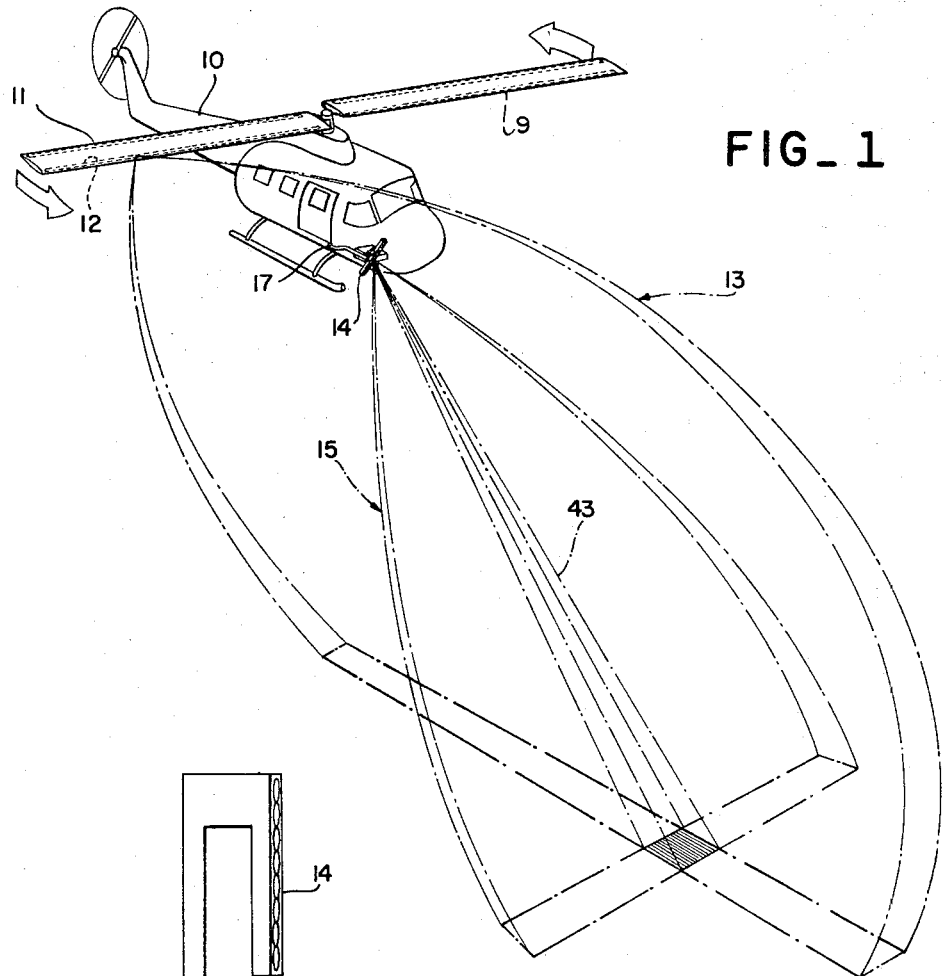
FIG_1
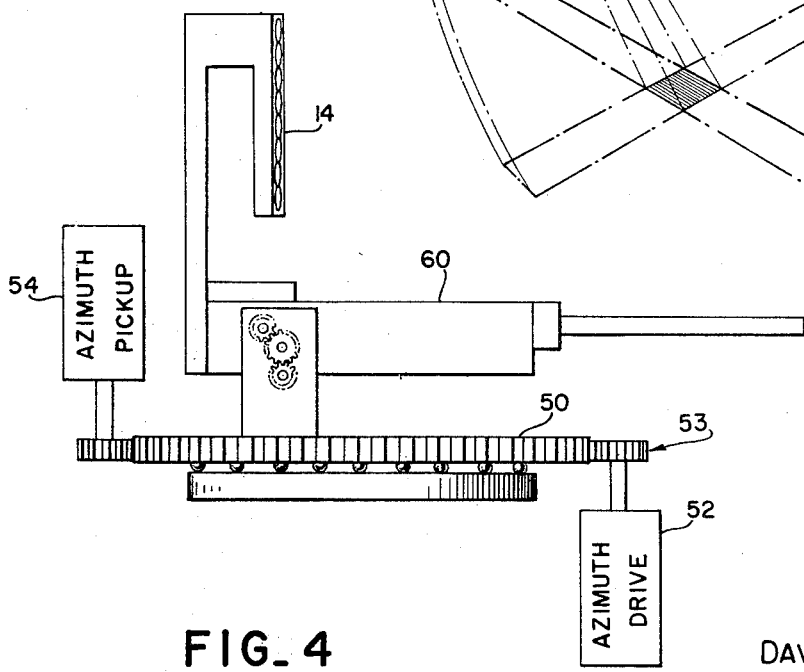
FIG_4
INVENTOR.
DAVID W. YOUNG, JR.
BY George C. Sullivan Agent
Billy G. Carber
Attorney

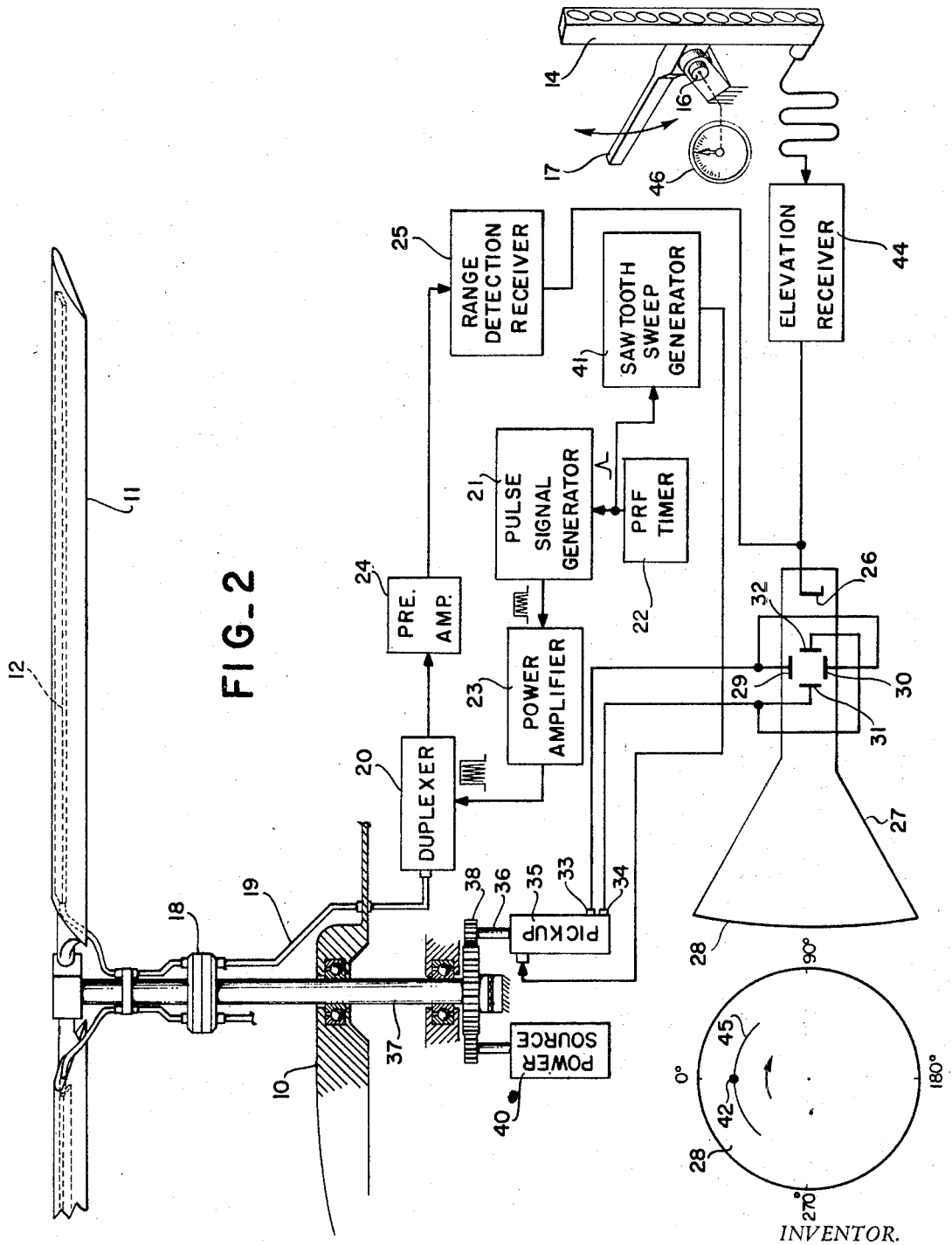

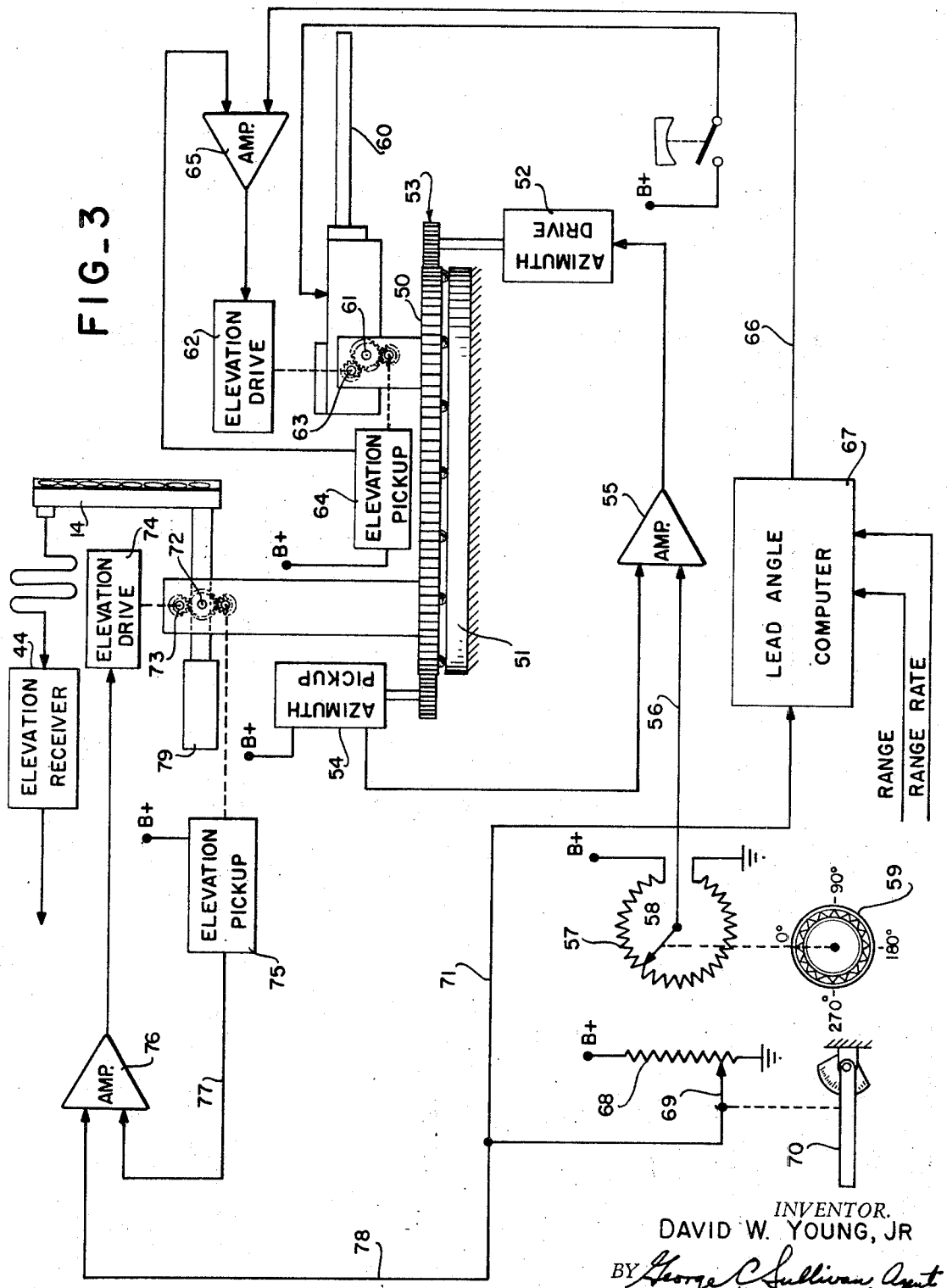

United States Patent Office 3,528,070
Patented Sept. 8, 1970

3,528,070
MULTIFUNCTION CROSSED BEAM RADAR SYSTEM
David W. Young, Jr., Warren, N.J., assignor to Lockheed Aircraft Corporation, Burbank, Calif.
Continuation-in-part of application Ser. No. 536,171, Feb. 14, 1966. This application Dec. 30, 1968, Ser. No. 787,763
Int. Cl. G01s 9/06
U.S. Cl. 343—11                10 Claims

ABSTRACT OF THE DISCLOSURE

A multifunction airborne radar system generating a vertical fan beam of radiant energy continuously movable in azimuth for terrain mapping with a plan position indicator type display screen and including additional antenna means having a fan beam energy response pattern generally normal to the vertical fan beam and movable in elevation to intersect the vertical fan beam at selected elevation angles for detecting reflected energy and generating a range marker on the display screen defining an elevation aiming angle for performing various target tracking functions including establishing glide slopes, clearance planes and directional control information.

BACKGROUND OF THE INVENTION

This is a continuation-in-part of my copending application, Ser. No. 536,171, filed Feb. 14, 1966, entitled, "Slotted Waveguide Antenna with Movable Waveguide Ridge for Scanning," which is a division of my application Ser. No. 292,902, filed July 5, 1963, entitled, "Radar System," now abandoned.

This invention relates generally to radar and more particularly to a multifunction radar system which obtains elevation angle information on selected targets using a range and azimuth display of the plan position indicator type.

In the field of navigation, terrain mapping, terrain avoidance, anticollision and aircraft landing approach radar systems, as well as, to some extent, fire control and automatic guidance radar systems, there is a need for radar and radar presentation which shows the observer what his eye would see in a given field of view but for fog, clouds, rain, snow, darkness, or other visual obstacles including physical structures.

Although the present invention finds particularly useful application in airborne terrain avoidance and landing approach radar, and although much of the discussion herein relates directly thereto for purposes of clarity and a ready understanding of the invention, it is to be understood that the invention is not limited to such uses. Other applications, such as in boats, hydroplanes, or space rendezvous systems, will be readily apparent to those skilled in the art.

With terrain mapping and terrain avoidance radar systems heretofore available, an airplane or helicopter pilot, in approaching, e.g., broken terrain or a landing strip at night, may have visual guidance through observation of terrain obstacles and runway lights. However, when these are periodically or suddenly obscured, the pilot has either to accept the temporary "blindness" or resort to instruments, the information from which is presented to him in a form totally different from the actual visual presentation to the eye through the airplane windshield. Typically, the instrument information is audio or visual by way of several different instruments mounted in the cockpit. Furthermore, at best, no single such instrument heretofore available presents a desirable amount of information as to position, range through parallax or changing spatial relationships, and character of terrain, obstacles and runway. The deficiencies and dangers of, as well as the difficulties of, using the prior art systems in such situations are manifest.

SUMMARY OF THE INVENTION

It is a primary object of the present invention to provide a multifunction radar system which applies both target elevation angle information and a terrain mapping display of objects in the field of view according to their relative range and azimuth positions. An elevation angle range marker generated by reflected energy from the target is superimposed on the terrain mapping display for performing various tracking functions including establishing glide slopes, clearance planes and directional control information. Radiant energy in a vertical fan beam pattern is swept in azimuth using a rotating horizontal transmitting antenna to provide reflected energy from objects within the viewing field. The reflected energy is detected by a dual receiver system. One receiver preferably utilizes the transmitting antenna operating in a receive mode to drive a plan position indicator type display unit to give relative range and azimuth positions of reflective objects in the viewing field. The other receiver is used to generate a marker on the display screen representing the elevation aiming angle of a vertical antenna angularly movable in elevation and having a generally horizontally oriented fan beam energy response pattern orthogonally intersecting the vertical fan beam. Positioning of the vertical antenna so that the range marker intersects with a selected target appearing on the display screen provides the desired elevation angle information.

Another object of this invention is to provide a multifunction radar antenna system employing at least two antennas arranged to provide at least two intersecting fan beam energy response patterns such that the intersection of spatial coincidence defines a narrow pencil beam. One of the fan beams is generally horizontally oriented and movable in elevation, while the other is generally vertically oriented and movable in azimuth. The vertically oriented beam is continuously rotated in azimuth such as by mounting the antenna in a helicopter rotor blade while the horizontally oriented beam is selectively moved in elevation only to aim the pencil beam at a desired target within the total field of view.

Another object of this invention is to provide an antenna system with narrow beam resolution which is substantially unlimited in angular scanning rate, raster frame rate, and range; and which is mechanically relatively simple, rugged, adaptable to very small airframes, and inexpensive to manufacture, install and maintain. The system can be installed and operated on most helicopters with essentially no aerodynamic drag penalty.

Still another object of this invention is to provide a crossed beam multifunction radar system which presents, throughout a given solid viewing angle, a visual presentation of the viewing field including elevation angle information with respect to selected targets.

Further and other objects and advantages will become apparent from the following detail description, especially when considered together with the accompanying drawing wherein like numerals refer to like parts.

BRIEF DESCRIPTION OF THE DRAWING

FIG. 1 is a perspective view of a helicopter vehicle embodying an example of the present invention and showing typical orientation of the intersecting fan beam;

FIG. 2 is a schematic view of an example of a crossed beam radar system constructed in accordance with the principles of the present invention;

FIG. 3 is a schematic view showing a modification incorporating the basic crossed beam system into a gun laying radar fire control system; and FIG. 4 is a schematic view showing a modification of the FIG. 3 device wherein the vertical antenna and gun are moved in elevation by a common servo system.

DESCRIPTION OF THE PREFERRED EMBODIMENTS

Referring to the figures in more detail, it is stressed that the particulars shown are by way of example and for purposes of illustrative discussion only, and are thus presented in the cause of providing what is believed to be the most useful and readily understood description of the principles and structural concepts of the invention.

In FIG. 1 is shown a helicopter 10 having rotor blades 11 with leaky waveguide type antennas 12 mounted in the leading edge portion of one or more of the blades. The detail construction of the waveguide antenna forms no part of this invention and is accordingly not shown or described herein in detail. Attention is directed to my copending application identified above and to U.S. Pat. No. 3,389,393, issued to D. W. Young, Jr., and entitled, "Low Profile Broadband Microwave Antenna System," for a detailed showing of rotor blade antenna suitable for use in the radar system of this invention. Such antennas exhibit a fan beam radiation pattern generally normal to the plane of the rotor as indicated by vertical fan beam 13.

As rotor blade 11 swings about its generally vertical axis, vertical fan beam 13 is repeatedly swept in azimuth across the desired field of view at a frequency sufficient to drive the radar display. In helicopter installations, a single antenna in one of the rotor blades will typically provide adequate system resolution, however, where desired, the repetition rate of the vertical fan beam may be increased by the use of antennae in more than one blade.

A second antenna 14 which may be of a type similar to that mounted in the rotor blade is oriented such that its characteristic fan shaped narrow beam pattern 15 is typically in a generally horizontally oriented plane orthogonal to vertical fan beam 13. Fan shaped narrow beam 15 is movable in elevation by pivotally mounting vertical antenna 14 to swing about a generally horizontal axis 16 as most clearly shown in FIG. 2. Positioning of antenna 14 to establish the desired elevation angle for beam 15 may be accomplished remotely, as taught in the above-identified copending application, or by movement of lever 17 manually by the radar operator.

As best shown in FIG. 2, rotor blade antenna 12 is suitably coupled through microwave rotary joint 18 and waveguide 19 to a duplexer 20 forming a part of the radar system and housed within helicopter 10. The details of the microwave feed system between rotor blade antenna 12 and duplexer 20 form no part of this invention and are disclosed in copending application, Ser. No. 706,068, filed Feb. 16, 1968 by Blume et al. and entitled, "Improved Multichannel Waveguide Rotating Joint." Where antennas in more than one rotor blade are employed for the system, they may be separately coupled through the rotary joint or through a common feed to duplexer 20. Also, where one of the rotor blades carries a trailing edge antenna, as illustrated at 9 in FIG. 1, and used only for reception, it may be coupled directly to the radar receiver section, eliminating the need for duplexer 20. Even only one rotor blade antenna is employed in the system for both transmission and reception, it may be desirable to duplicate the rotating hardware as illustrated in FIG. 2 for dynamic balancing purposes.

Duplexer 20 in the system of FIG. 2 serves the customary purpose of isolating the receiver section of the radar system while passing energy from the transmitter section to the radiating antenna and isolating the transmitter section while passing reflected energy through to the receiver section during the intervals between application of radar pulses. The transmitter section of the radar system includes a pulse signal generator 21 which is keyed to trigger pulses from a timer 22 to produce a continuous series of radar pulses of high frequency electromagnetic energy at a pulse repetition rate determined by the timer output. The radar pulses from signal generator 21 are applied to a power amplifier 23 and fed to rotor blade antenna 12 via duplexer 20.

The pulses of high frequency electromagnetic energy are radiated from the rotor blade antenna as a narrow vertical fan beam. The beam is swept in azimuth using a power source 40 as shown in FIG. 2 drivingly engaging rotor shaft 37 through gear train 38. On a helicopter, the power source maintains the desired rotor blade rotational velocity both to produce lift for the vehicle and azimuth scanning of the vertical fan beam.

Portions of the radiated fan beam energy are reflected by remote targets such as those on the earth's surface and conveniently received through the same rotor blade antenna 12 as was used for energy transmission. The received energy is fed through duplexer 20 to a preamplifier 24. The amplified return signals are applied to a range detection receiver 25 and processed to provide an electron emitting control voltage for cathode 26 of a cathode ray display tube 27. The electron beam emitted by cathode 26 is focused on the face 28 of tube 27 forming a visible image of the reflective objects in a plan position indicator type presentation according to their relative range and azimuth positions.

Vertical deflection plates 29 and 30 of display tube 27, as well as horizontal deflection plates 31 and 32, are coupled to respective outputs 33 and 34 of a resolver type pickup 35. Input shaft 36 of resolver pickup 35 is operatively coupled to rotor blade shaft 37 through suitable gearing 38 whereby the rotational position of resolver input shaft 36 represents the rotational or instantaneous azimuth position of vertical fan beam 13 associated with rotor blade antenna 12. The two outputs 33 and 34 of resolver pickup 35 represent the sine and cosine functions of the rotational movement of the rotor blade.

The applied voltage for resolver pickup 35 is obtained from a sawtooth sweep generator 41 which is synchronized by timing pulses from timer 22 with the radar pulse output of signal generator 21. The sweep voltage applied to resolver pickup 35 from sweep generator 41 rises linearly, starting with each transmitted radar pulse and ending at some predetermined later time before transmission of the next succeeding radar pulse, representing the maximum range of the radar device. Thus, when the outputs 33 and 34 of resolver pickup 35 are applied to the vertical and horizontal deflection plates 29, 30, 31 and 32 of cathode ray tube 27, a beam deflecting magnetic field is generated within the tube which rotates in synchronism with the rotation of rotor blade antenna 12 while its field strength repeatedly increases linearly with time to represent the range sweep of the transmitted radar pulse energy. The reflective objects within the radar field of view are presented on the viewing screen according to their relative range and azimuth position, as illustrated in FIG. 2. The distance of image 42 from the center of tube face 28 represents the range of a reflective object and the rotational position of image 42 represents the relative azimuth position of the remote object. In reality of course, numerous objects will be illuminated by the vertical fan beam and made to appear on the viewing screen at their respective range and azimuth positions. Thusly, an image of the viewing field of the radar is formed on face 28 of display tube 27. When the fan beam is directed to impinge upon the earth's surface from an airborne vehicle, a map of the surrounding terrain which may include a landing strip, for example, will be displayed to the operator with various obstacles appearing according to their respective range and azimuth locations relative to the vehicle.

The third spatial dimension, elevation, is presented for selected targets in accordance with the teachings of this invention through the use of vertical antenna 14 having a characteristic fan beam radiation response pattern 15 as illustrated in FIG. 1 orthogonally intersecting vertical fan beam 13. The intersection of the vertical and horizontal fan beams defines a narrow pencil beam 43. By positioning antenna 14 to provide a desired elevation aiming angle for the generally horizontally oriented fan beam 15, the reflective object in narrow pencil beam 43 is detected by reflected energy which is applied to an elevation receiver 44. The output of elevation receiver 44 is a control voltage for cathode 26 of display tube 27. An elevation angle marker 45 is thus formed on tube face 28 at the target range position. The tilt angle of fan beam 15 represents the elevation angle of the desired target when marker 45 intersects the selected target image on the display screen. Through manipulation of lever 17, horizontal fan beam 15 may be moved to any desired elevation position within the field of view to provide elevation angle information on selected targets such as a landing strip, a suspected terrain obstacle, or a ground or airborne target.

In using the system to establish a desired glide slope to a touchdown point, the operator simply adjusts the tilt angle of vertical antenna 14 such that the elevation angle marker 45 on face 28 of tube 27 intersects the desired landing spot and flies the vehicle holding the vertical antenna tilt angle constant while maintaining a flight path causing elevation angle marker 45 to stay on the preselected target imaged on the face 28 of display tube 27. Should elevation angle marker 45 move out in range from the selected target image, in indication is presented to the operator that the vehicle is above the desired glide slope path and, should the elevation angle marker 45 move below the selected target image, an indication is provided that the vehicle has dropped below the desired glide slope path.

Clearance planes over terrain obstacles may be established in a similar manner by determining the elevation angle of the obstacles and flying the vehicle to maintain desired clearance between the vehicle and the obstacles.

As shown in FIG. 2, the tilt angle of vertical antenna 14 relative to the vehicle may be measured and presented to the operator in readable form such as by dial indicator 46 coupled to shaft 16 defining the axis of rotation of the vertical antenna. Calibration of dial indicator 46 in degrees will permit the operator to readily determine any desired elevation angle within the viewing field of the system.

Because of the narrow profile of vertical antenna 14, it may be mounted either internally of the vehicle or externally without appreciably affecting aerodynamic drag, pilot visibility, or armament and other equipment space requirements.

A modification is shown in FIG. 3 for adapting the radar device to a gunfire control system. Gun platform 50 is shown rotatably supported on vehicle structure 51 for azimuth positioning by an azimuth drive motor 52 operating through a gear train 53. An azimuth pickup 54 which may be of the potentiometer type is also driven by gear train 53 to control azimuth drive motor 52 through a servo amplifier 55. The manual control input 56 to servo amplifier 55 is generated by suitable means such as a potentiometer 57 having a wiper arm 58 positioned by a manually operable direction control knob 59. Any desired azimuth aiming angle may be selected for gun 60 through positioning of control knob 59.

Gun 60 is mounted on platform 50 for movement in elevation about axis 61. An elevation drive motor 62 operatively connects with gear train 63 to remotely control the elevation angle setting of gun 60. Drive motor 62 is controlled through the output of an elevation pickup 64 operatively connecting with gear train 63 and providing a feedback voltage to servo amplifier 65. The control voltage for servo amplifier 65 is applied through lead 66 from a conventional lead angle computer 67.

An elevation control voltage is generated by potentiometer 68 having a wiper 69 coupled to lever 70. Lever 70 is the functional equivalent of lever 17 in FIG. 2 and is manually positioned to supply the desired elevation angle signal to lead angle computer 67 through lead 71. The lead angle computer modifies the elevation angle input signal to correct for the usual variables such as range and range rate affecting the aiming accuracy of the fire control system. If desired, the azimuth drive for the gun platform may likewise be corrected.

Azimuth aiming information is supplied to the fire control operator by observing the target image on the face of cathode ray tube 27 while the elevation angle information is supplied to the operator by adjusting lever 70 to maintain elevation angle marker 45 at intercept with the selected target image as it is displayed on the face 28 of display tube 27.

Elevation antenna 14, as shown in FIG. 3, is mounted on gun platform 50 and counterbalanced by weight 79 for movement in elevation relative to the platform about axis 72, which is generally parallel with gun axis 61. A gear train 73 couples the antenna to an elevation drive motor 74. Drive motor 74 is controlled by a servo system including elevation pickup 75 and servo amplifier 76. Elevation pickup 75 senses the tilt angle of vertical antenna 14 operating through gear train 73 to provide a feedback voltage to amplifier 76 through lead 77. The control voltage for servo amplifier 76 is obtained through lead 78 coupled to the wiper 69 on potentiometer 68. Hence, vertical antenna 14 is made to move horizontal fan beam 15 to the desired sector within the field of view for intercept with a selected target by manipulation of the same lever 70 which controls the elevation angle of gun 60. The operator simply maintains elevation angle marker 45 coincident with the selected target image appearing on display tube 27 to aim the gun in elevation.

Where lead angle correction for the gun positioning servos is unnecessary, it is believed obvious that vertical antenna 14 may be fixedly secured to gun 60 rather than made independently movable in elevation on gun platform 50 as shown in FIG. 4, thus dispensing with the separate antenna servo drive system.

Although the multifunction crossed beam radar system is shown and described herein in combination with a helicopter vehicle, it is to be understood that the system may be used to advantage in other environments including conventional airplanes and that the vertical fan beam may be swept in azimuth by means other than a rotor blade. Fixed antenna with electronic or electromechanical scanning may be employed, for example. Similarly, vertical antenna 14 which provides the intersecting horizontal fan beam for providing elevation data with respect to selected targets may be caused to scan the field of view by electronic or electromechanical means in lieu of physically moving the antenna as disclosed herein. Such alternatives are shown and described in detail in the above-identified copending application. It is to be further understood that these and other modifications, alterations and substitutions may be made to the instant disclosure.

I claim:

1. A multifunction radar system comprising, transmitter means radiating electromagnetic energy in a search fan beam pattern which sweeps repeatedly about one axis across a desired field of view, receiver means detecting said energy reflected from objects in said field of view, position sensing means associated with said transmitter means and providing a signal representing the instantaneous position of said fan beam, visual display means responsive to the output from said receiver means and said position sensing means and having a viewing screen providing a plan position indicator display of objects in the field of view according to their relative range and angular position about said one axis, an antenna disposed approximate said transmitter means and having a narrow beam energy response pattern movable about a second axis normal to said one axis and intersecting the fan beam at any of a variety of selected angles within said field of view, and receiver means coupled to said display means and responsive to energy picked up by said antenna for generating a range marker on the viewing screen which is movable with said antenna to define an aiming angle about said second axis for target tracking.

2. A multifunction radar system comprising, transmitter means radiating electromagnetic energy in a generally vertically oriented search fan beam which sweeps repeatedly in azimuth across a desired field of view, receiver means detecting said energy reflected from objects in said field of view, sensing means associated with said transmitter means and providing a signal representing the instantaneous azimuth position of said fan beam, visual display means responsive to the output from said receiver means and said position sensing means and having a viewing screen providing a plan position indicator display of objects in the field of view according to their relative range and azimuth position, an antenna disposed approximate said transmitter means and having a narrow beam energy response pattern movable in elevation to intersect the vertical fan beam at any of a variety of selected elevation angles, and receiver means coupled to said display means and responsive to energy picked up by said antenna for generating a range marker on the viewing screen which is movable with said antenna to define an elevation aiming angle for target tracking.

3. A multifunction radar system comprising, transmitter means radiating pulsed electromagnetic energy in a generally vertically oriented fan beam which sweeps repeatedly in azimuth across a desired field of view, receiver means detecting said energy reflected from objects in said field of view, position sensing means associated with said transmitter means and providing a signal representing the instantaneous azimuth position of said fan beam, a cathode ray tube connecting with the output from said receiver means and said position sensing means and having a viewing screen providing a plan position indicator display of objects in the field of view according to their relative range and azimuth position, an antenna disposed approximate said transmitter means and having a fan shaped narrow beam energy response pattern generally normal to said vertically oriented fan beam and movable in elevation to intersect the vertical fan beam at any of a variety of selected elevation angles, and receiver means coupled to said cathode ray tube and responsive to energy picked up by said antenna for generating a range marker on the viewing screen which is movable with said antenna to define an elevation aiming angle for target tracking.

4. A device as defined in claims 1, 2 or 3 including a rotor blade, a leaky waveguide antenna mounted in said rotor blade and forming said fan beam, and means for rotating said rotor blade to sweep said beam across the desired field of view.

5. A device as defined in claims 1, 2 or 3 including control means for moving said narrow beam to selected aiming angles within said field of view.

6. A device as defined in claim 5 wherein said control means is a manually operable lever.

7. A device as defined in claim 5 including direct reading means for indicating the aiming angle of said narrow beam.

8. A device as defined in claims 1, 2 or 3 including a weapons launching platform movable about one axis, a weapon mounted on said platform for movement about a second axis generally normal to said one axis, drive means for moving said platform and said weapon about their respective axes to aim said weapon toward any selected target within the radar field of view, and servo means controlling said drive means to coordinate the movement of said weapon with the movement of said narrow beam.

9. A device as defined in claim 8 wherein said antenna is carried on said platform and coaxially movable with said weapon relative to said platform.

10. A device as defined in claim 9 including a lead angle computer for variably displacing the weapon aiming angle relative to the aiming angle of said narrow beam.

References Cited

UNITED STATES PATENTS

| | | | |
|---|---|---|---|
| 2,625,678 | 1/1953 | Allison | 343—11 |
| 3,337,868 | 8/1967 | Bell | 343—11 |

RODNEY D. BENNETT, Jr., Primary Examiner

T. H. TUBBESING, Assistant Examiner